Sept. 13, 1960   J. R. ORELIND ET AL   2,952,323
IMPLEMENT ATTACHING STRUCTURE

Filed July 21, 1954   4 Sheets-Sheet 1

INVENTORS
JOHN R. ORELIND
FREDERICK M. PIERSON
Paul O. Pippel
ATTORNEY

Sept. 13, 1960 J. R. ORELIND ET AL 2,952,323
IMPLEMENT ATTACHING STRUCTURE
Filed July 21, 1954 4 Sheets-Sheet 3

INVENTORS
JOHN R. ORELIND
FREDERICK M. PIERSON
Paul O. Pippel
ATTORNEY

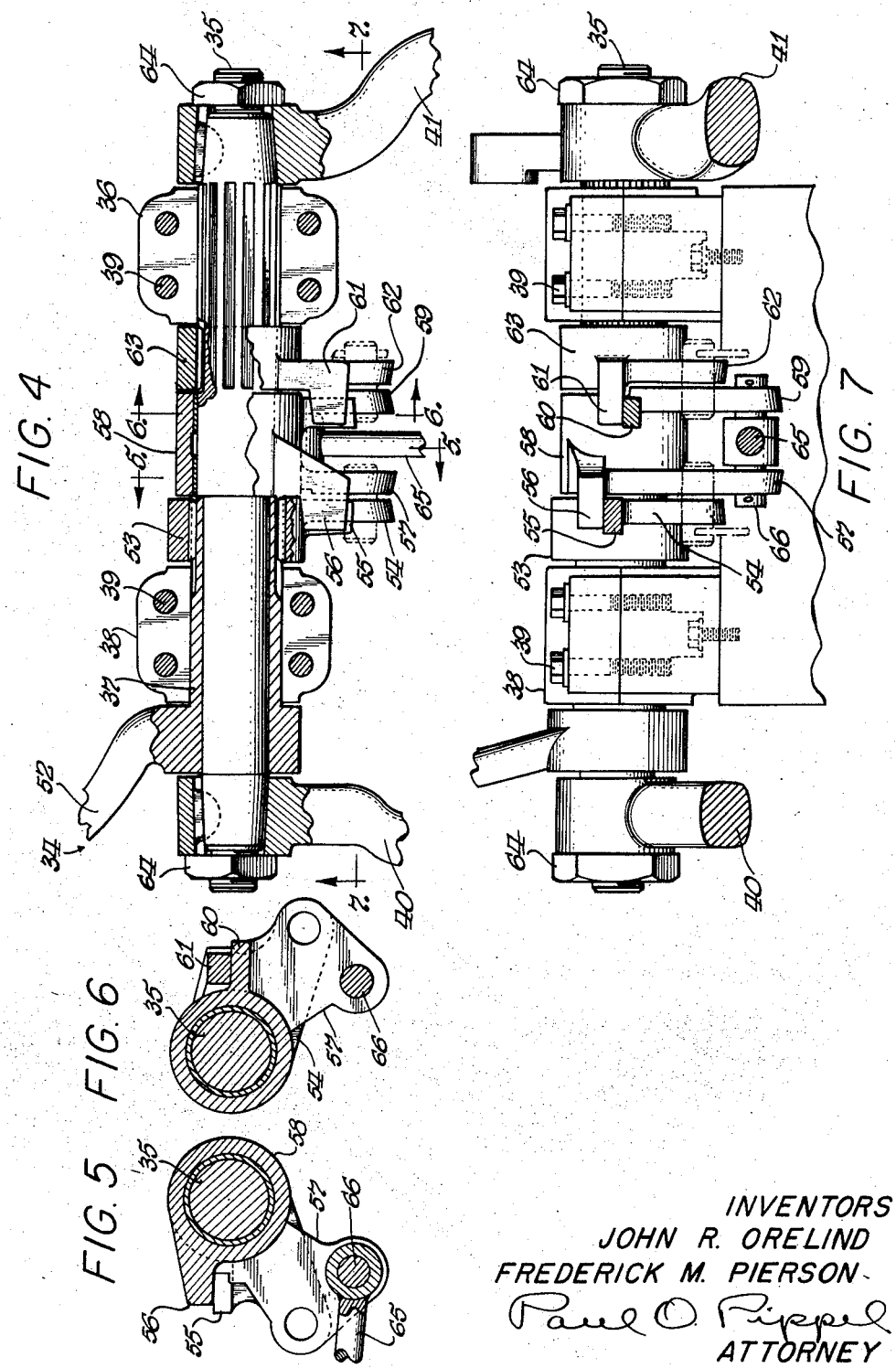

United States Patent Office 2,952,323
Patented Sept. 13, 1960

2,952,323

IMPLEMENT ATTACHING STRUCTURE

John R. Orelind, Wilmette, and Frederick M. Pierson, Canton, Ill., assignors to International Harvester Company, a corporation of New Jersey Filed July 21, 1954, Ser. No. 444,752

2 Claims. (Cl. 172—248)

This invention relates to implement attachments for tractors and particularly to hitching apparatus for connecting an implement to a tractor to be controlled therefrom and to be carried thereon in transport.

Tractors of the so-called "three-point" type are well known. Such a tractor is provided with three triangularly related attaching points or elements adapted for cooperative association with three complementary attaching elements on the implement. In a tractor of this type the operating position of the implement is usually controlled by exerting thrust through the upper attaching part to tilt the implement about a transverse axis. Implements of the so-called "two-point" type are also known, wherein an integral connection is made between the tractor and implement only through a single pair of laterally spaced complementary connecting elements on the tractor and implement.

An object of this invention is the provision of an improved implement attaching apparatus for tractors incorporating means for attaching an implement to and detaching it from a tractor with a minimum expenditure of time and labor, by the simple expedient of driving the tractor to the implement to make the connection and driving the tractor away to disconnect the implement therefrom, all without the necessity of the operator leaving his seat on the tractor.

Another object of the invention is the provision of adapter apparatus for a tractor of the three-point type whereby implements having only a pair of attaching points may be readily connected thereto and controlled therefrom in the same manner as an implement of the three-point type.

Another object of the invention is the provision of an improved implement attachment for tractors including laterally spaced longitudinally elongated tubular socket members on the tractor adapted to slidably receive complementary elongated shaft-like members on the implement, and wherein the socket members are pivotally mounted on the tractor for rocking about transverse axes to control the operating depth of the implement.

Other objects and advantages of the invention will become clear from the following detailed description when read in conjunction with the accompanying drawings, wherein:

Figure 4 is a section on the line 4—4 of Figure 2;

Figure 5 is a section on the line 5—5 of Figure 4;

Figure 6 is a section taken on the line 6—6 of Figure 4; and

Figure 7 is a section on the line 7—7 of Figure 4.

Figure 1:
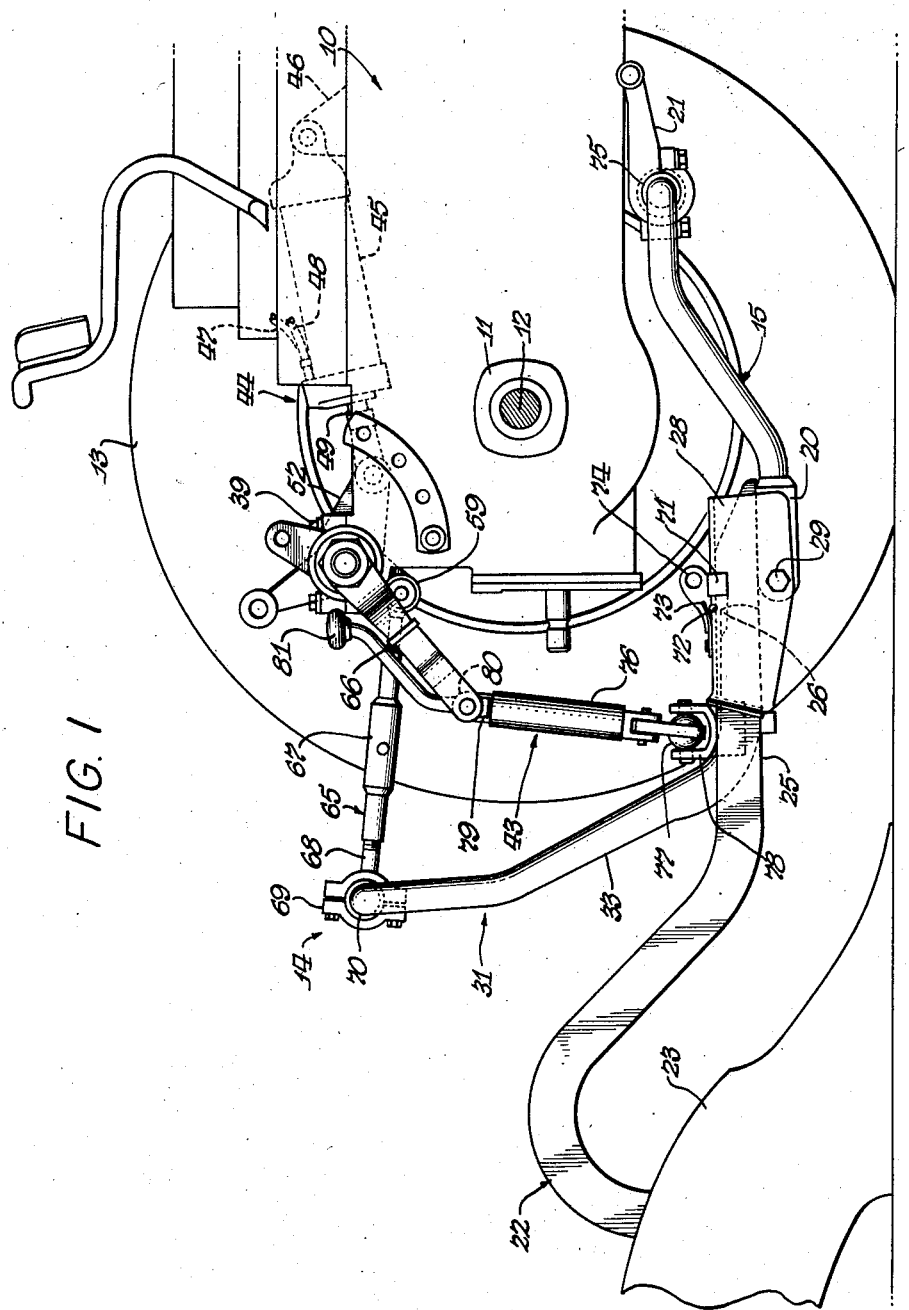
Figure 1 is a view in side elevation, partly in section, of the rear end of a tractor, with one wheel removed, having incorporated therein an implement attaching apparatus embodying the features of this invention, and illustrating the attachment of an implement in the form of a plow thereto.

Referring to the drawings, the numeral 10 designates the longitudinally extending body of a tractor having a conventional power plant. Extending laterally from opposite sides of the tractor body are rear axle structures 11 rotatably supporting axles 12 carrying drive wheels 13.

The tractor as shown in the drawings is the type generally provided with three triangularly arranged connecting elements for the connection to the tractor of implements having three correspondingly triangularly arranged connecting points to form an integral association between the tractor and implement. The tractor as shown has incorporated therein implement attaching apparatus by which the tractor is made adaptable for the attachment thereto of an implement of a type having only two connecting elements. This element attaching apparatus is generally designated by the numeral 14, and includes a U-shaped draw frame 15 having a transverse portion 16 and rearwardly extending laterally spaced arms 17 and 18 which terminate in implement attaching parts 19 and 20, respectively.

The draw frame 15 is pivotally mounted for vertical swinging movement in a bracket 21 below the tractor body and secured thereto. The attaching parts 19 and 20 at the ends of the draw frame arms 17 and 18 are flattened in a vertical plane for a purpose which will hereinafter become clear.

The implement attaching apparatus 14 is adapted for the integral connection to the tractor of a fragmentarily illustrated implement in the form of a moldboard plow 22 including one or more plow bottoms 23 and a pair of laterally spaced longitudinally elongated shaft-like attaching elements 24 and 25. The forward end of each of these attaching elements 24 and 25 is beveled as indicated in Figure 1, and is provided on its upper edge with a transverse groove 26.

The respective shafts 24 and 25 of the implement are adapted for sliding reception in complementary longitudinally elongated tubular, socket-like members 27 and 28, respectively. Each of the implement attaching parts 19 and 20 of the draw frame 15 has mounted thereon a transverse pivot pin 29. Each of the socket members 27 and 28 is provided with depending legs 30 which straddle the respective flattened attaching parts 19 and 20 of the draw frame 15 and are mounted upon the pivot pin 29. It should be clear that the socket members 27 and 28 are capable of vertical swinging movement relative to the draw frame 15 about the pivots of the pins 29. The implement 22 is thus also pivotable in a vertical plane about the axis of the pins 29. By adjusting the sockets 27 and 28 about the axes of the pins 29, the angle of penetration of the plow bottom 23 in the ground can be varied to adjust its depth of operation. The implement attaching apparatus of this invention includes power transmission and lift means by which adjustments are made in the operating position of the implement and vertical movement of the implement between operating and transport positions is accomplished.

The socket members 27 and 28 are rigidly connected by an arch-shaped member 31 having a transverse portion 32 and depending legs 33 affixed, as by welding, to the respective sockets. Thus it will be noted that the sockets 27 and 28 and the implement 22 may be rocked about a transverse axis represented by the pivot pins 29 by swinging the rigid arch 31 generally forwardly and rearwardly.

Raising and lowering of the implement and of the draw frame about the connection thereof to the bracket 21, as well as the adjustment of the operating depth of the earth-working tool, is accomplished through power transmission means including a rockshaft assembly generally designated at 34. The rockshaft unit 34 includes a transversely extending shaft 35 rotatably mounted near its right hand end in a bearing 36 and surrounded near its other end by a sleeve 37 rotatably carried in a bearing block 38. The bearing blocks 36 and 38 include separable sections held together by bolts 39. Each end of the shaft 35 has keyed thereto lift arms 40 and 41 which are connected by vertical links 42 and 43 to the lower ends of the legs 33 of the arch 31.

Rocking of the shaft 35 and the arms 40 and 41 is accomplished by the provision of a hydraulic ram comprising a cylinder 45 anchored to a lug 46 mounted on the tractor body. Cylinder 45 receives fluid under pressure through a pair of hose lines 47 and 48 from a source of fluid pressure on the tractor, not shown, deriving power from the tractor power plant. The mechanism controlling the flow of fluid to the cylinder 45 is preferably one accommodating the feeding of fluid thereto in small increments and locking the fluid in the cylinder so that the finest adjustments can be made in the operating position of the implement 22. The ram 44 is preferably of the double acting type and a piston rod 49 is slidable therein and provided at its end with a clevis 50 connected by a pin 51 to the end of a rock arm 52 affixed to and projecting from one end of the sleeve 37.

Sleeve 37 is rotatable upon the shaft 35 and has splined thereto on the opposite side of bearing block 38 from rock arm 52 a collar 53. Collar 53 has projecting radially therefrom a lug 54 having an abutment 55 thereon.

Abutment 55 is engageable, upon rocking the arm 52 and sleeve 37, with a laterally extending shoulder 56 formed integral with a lug 57 affixed to and projecting radially from a sleeve 58 rotatably mounted upon the shaft 35. Another lug 59 integral with the sleeve 58 and projecting therefrom is provided with an abutment portion 60 which is engageable with the laterally projecting shoulder 61 of another lug 62 affixed to and projecting radially from another collar 63 which is splined to the shaft 35. It should thus be clear that upon rocking the arm 52, motion is transmitted through sleeve 37 and collar 53 to sleeve 58 and from sleeve 58 to the shaft 35 through the collar 63. The parts are secured in place on the shaft 35 by the provision of nuts 64, one at each end of the shaft.

Figure 3:
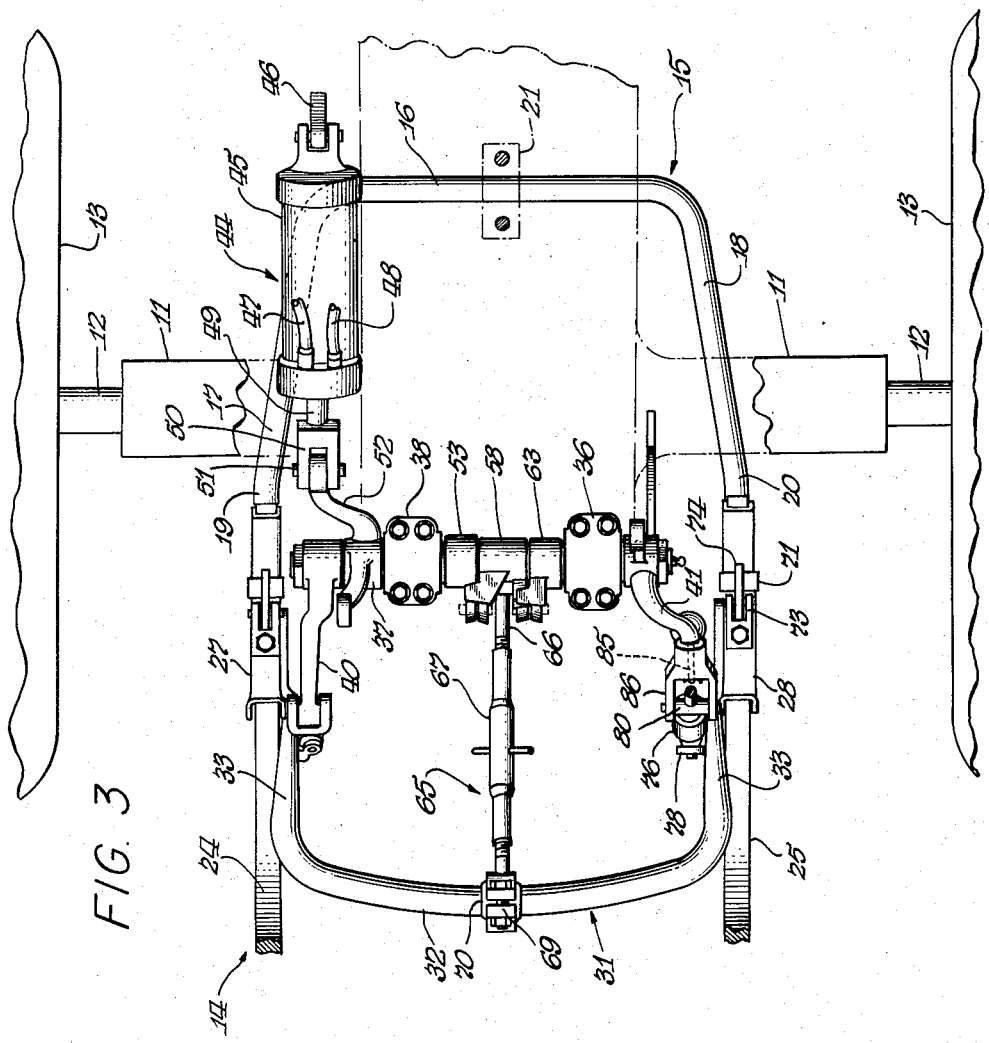
Figure 3 is a plan view, partly in section, and with parts removed, of the structure shown in Figure 1.

In the position of the parts shown in Figures 4 to 7, rocking of the arm 52 by actuation of the ram 44 transmits lifting power through the shaft 35 to the lift arms 40 and 41 to raise and lower the draw frame 15 and the implement 22. It should be pointed out, however, that rocking of the shaft 35 and lifting of the implement is accomplished only after sleeve 58 has been rocked through its connection with collar 53, sleeve 37 and rock arm 52, to a position in which the abutment 60 has come into engagement with the shoulder 61 on collar 63. In the operating position of the implement the abutment 60 moves away from the shoulder 61 so that there is provided a range of rocking movement of the sleeve 58, collar 53 and sleeve 37 which does not effect any vertical movement of the implement. This range of movement is utilized to adjust the operating depth of the implement by the provision of an auxiliary adjusting link in the form of a turnbuckle 65 comprising a threaded rod 66 pivotally mounted between the lugs 57 and 59. The threaded end of rod 66 is received in one end of a threaded sleeve 67, the other end of which is threaded to receive one end of a rod 68, the other end of which carries a clamp 69 having a socket and ball connection 70 with the transverse portion 32 of the arch 31. Thus, motion transmitted from the ram 44 through sleeve 37, collar 53 and sleeve 58, rocks the lugs 57 and 59, exerting thrust through the auxiliary adjusting link 65 to pivot the arch 31, sockets 27 and 28, and the implement 22 about the axes of the pins 29, to adjust the pitch of the earth-working tools, and therefore, their depth of operation. Minor adjustments in the pitch of the implement may be made by adjusting the length of the turnbuckle 65. Adjustment of the operating depth of the tools is, therefore, made independently of the raising and lowering of the implement. Continued operation of the ram 44, in this case the extension of piston rod 49 in the cylinder 45, brings the shoulder 60 of lug 59 into engagement with the part 61 of collar 63 to effect rocking of the shaft and lift arms 40 and 41, to raise the implement out of the ground and into transport position. From the foregoing, it should be clear that the triangularly arranged hitch points or connecting points on the tractor are the attaching parts 19 and 20 of the draw frame and the lugs 57 and 59 to which the link 65 is connected at one end. The two connecting points of the two-point hitch implement 22 are the elongated shaft members 24 and 25 which are slidably receivable, as indicated in Figures 1 and 3, in the respective elongated socket members 27 and 28.

In order to make the connection with the implement, the draw frame 15 is elevated or depressed to a position in longitudinal alignment with the shaft members 24 and 25. Upon backing the tractor to the implement the shafts 24 and 25 are slidably received in the respective sockets 27 and 28 until a latch detent 71 is received in the notch 26 in the upper edge of the respective shaft members 24 and 25. The latch 71 is pivoted on trunnions 72 mounted on the associated socket 27 or 28 and the latch detent is urged into the groove or notch 26 by a spring 73. The detent 71 is released from the groove 26 to accommodate withdrawal of the shafts 24 and 25 from the sockets by the provision of a handle 74.

The mounting of the transverse portion 16 of the draw frame 15 in bracket 21 includes a ball and socket joint 75 which accommodates lateral tilting or rocking of the draw frame 15, and, therefore of the implement, about a central longitudinal axis to accommodate leveling of the implement. Leveling adjustment is made through the right hand lifting link 43 which includes a threaded sleeve 76 connected at its lower end by a universal joint 77 to a clevis 78 affixed to the right hand leg 33 of the arch 31. A threaded rod 79 carried by a swivel 80 is received in the threaded sleeve 76, and is provided with a crank 81 by which the length of the lifting link 43 may be adjusted to level the implement.

Figure 2:
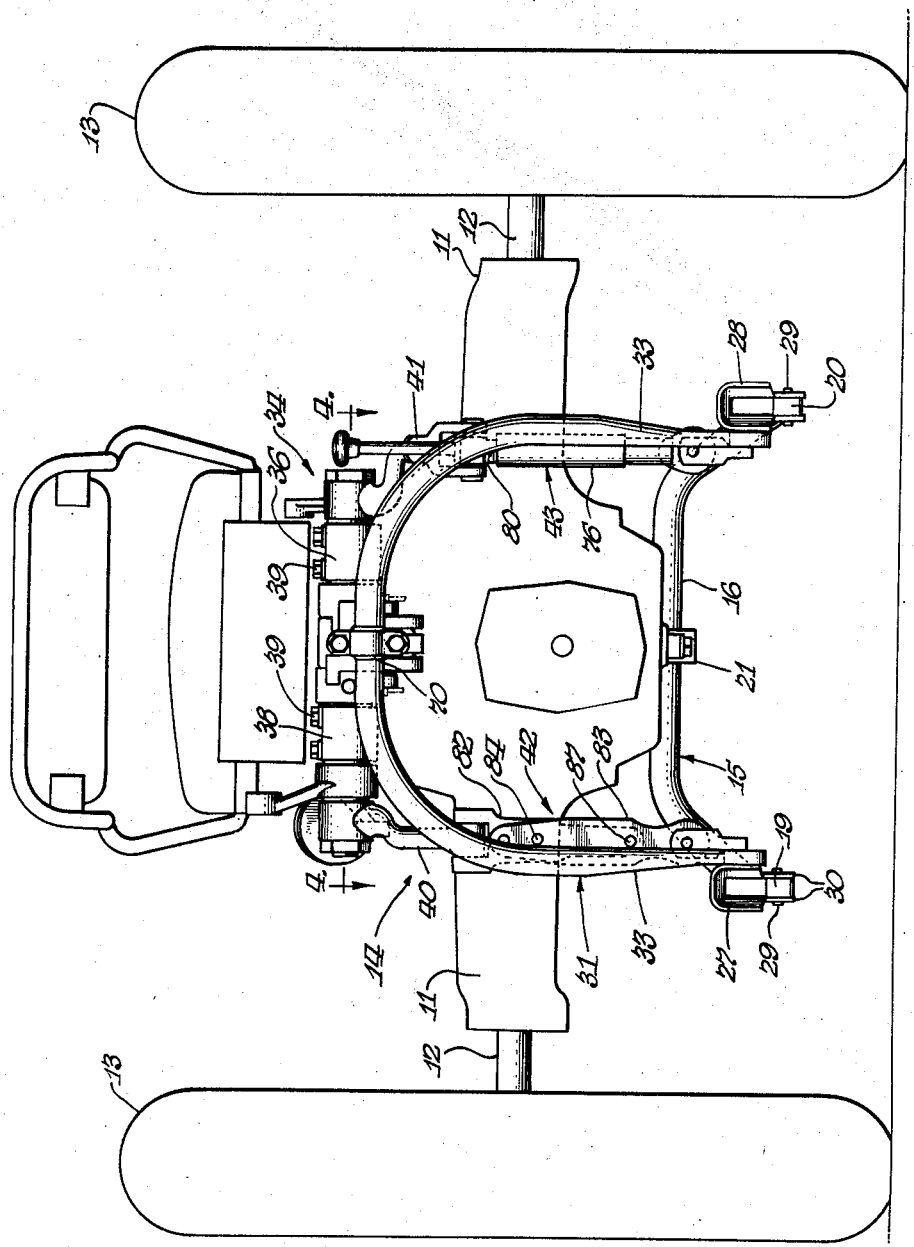
Figure 2 is an end elevation of the tractor hitch structure shown in Figure 1.

A number of implements of different types having laterally spaced longitudinally elongated shaft-like attaching elements may be connected to the tractor through the intermediary of the attaching structure of this invention. It is desirable that some of these implements be held in centered relationship with respect to the tractor and that other implements be allowed to swing laterally relative to the tractor to facilitate the following of the implement in the path of travel of the tractor. Means are, therefore, provided for optionally holding the implement and the attaching structure in a substantially fixed position with respect to the tractor, or to allow it to swing laterally. It will be observed particularly well in Figure 2 that the left hand link 42 is made up of upper and lower parts 82 and 83, respectively. These parts overlap and are connected by a pivot pin 84 accommodating a relative pivotal movement of the two parts of the link in a transverse plane. The lateral swinging of the hitch structure and of the implement connected thereto is accommodated in lifting link 43 on the right hand side of the tractor, by the provision of a reduced spindle portion 85 at the end of right hand lift arm 41 rotatably receivable in a suitable opening in the clevis 86 at the end of the arm 41, so that the clevis portion 86 of the lift arm is rotatable relative to the main part of the arm and accommodates the lateral swinging of the lift link 43.

Other registering openings such as 87 are provided in the parts 82 and 83 of lift link 42 for the optional reception of another pin, if and when desired, to render the link 42 rigid and hold the implement attaching structure and the implement against lateral swinging relative to the tractor. In the draw frame 15, this lateral swinging is accommodated by the ball joint connection 75 thereof to the bracket 21.

The invention herein has been described in its preferred embodiment, and it should be understood that modifications may be made therein without departing from the spirit of the invention or the scope of the appended claims.

What is claimed is:

1. For use with a tractor of the three-point type having an upper implement attaching part and laterally spaced lower implement attaching parts triangularly arranged with respect to said upper part and mounted on the tractor for vertical movement: apparatus for adapting the tractor for the mounting thereon of an implement of the two-point type having laterally spaced longitudinally elongated shaft-like attaching members, comprising a pair of laterally spaced longitudinally elongated socket members arranged to slidably receive said shaft-like members to form an integral tractor-implement association, an arched adapter frame having depending arms affixed to said socket members, means pivotally connecting said socket members to said lower implement attaching parts for angular adjustment of the adapter frame and said socket members about a transverse axis, lift means on the tractor operatively connected to said lower implement attaching parts for vertically moving the latter to raise and lower the implement, a link connecting the upper implement attaching part to said adapter frame, a rockshaft mounted on the tractor, a lug affixed to said shaft, said upper implement attaching part comprising an arm free on said shaft for rocking in a vertical plane and engageable with said lug during upward movement of the arm to rock the shaft in a direction to lift the implement, and power transmission means acting through said arm and reacting against the tractor to rock the adapter frame and said socket members about their pivots to regulate the depth of operation of the implement.

2. The invention set forth in claim 1, wherein in one range of movement of said arm prior to engaging said lug the link connecting the arm to the adapter frame is actuated to angularly adjust the latter to regulate the depth of operation of the implement.

References Cited in the file of this patent

UNITED STATES PATENTS

| | | |
|---|---|---|
| 2,557,637 | Danuser | June 19, 1951 |
| 2,562,817 | Pethick | July 31, 1951 |
| 2,583,830 | Goble | Jan. 29, 1952 |
| 2,678,596 | Todd | May 18, 1954 |
| 2,701,510 | Altgelt | Feb. 8, 1955 |